April 14, 1931.    S. B. STINE    1,800,705
PAN FOR CRUSHING MILLS
Filed Jan. 3, 1928
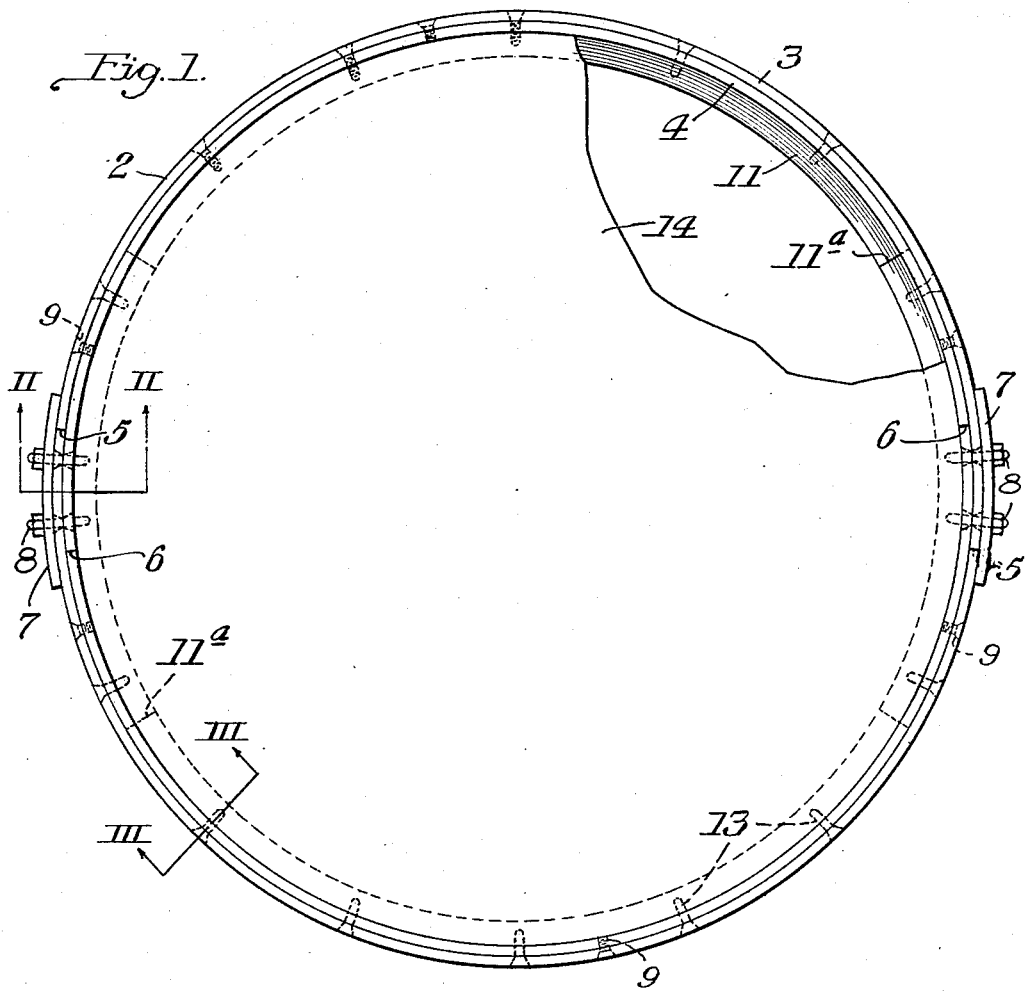
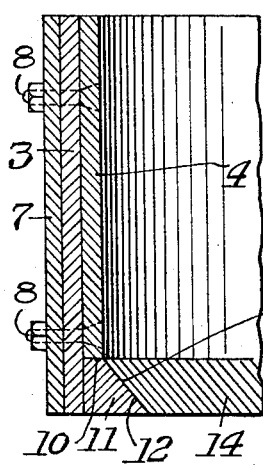
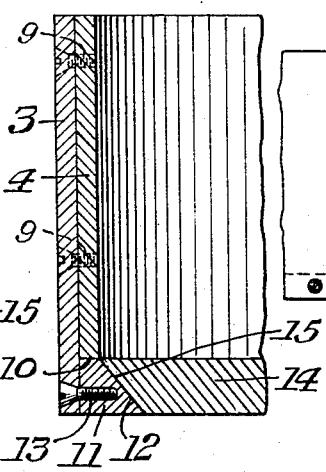
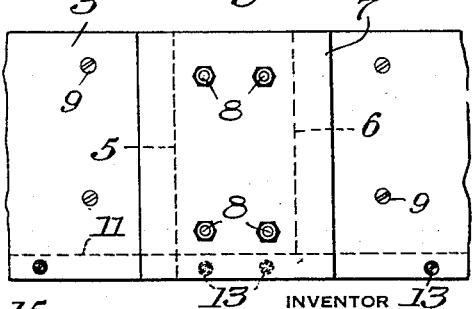
INVENTOR
Samuel Blaine Stine
By Archworth Martin,
Attorney Patented Apr. 14, 1931

1,800,705

UNITED STATES PATENT OFFICE

SAMUEL BLAINE STINE, OF OSCEOLA MILLS, PENNSYLVANIA

PAN FOR CRUSHING MILLS

Application filed January 3, 1928. Serial No. 244,140.

This invention relates broadly to grinding and mixing pans, and more particularly to pans of the type known as dry and wet pans for the grinding and mixing of clay and other material in the manufacture of bricks and refractories.

Heretofore, the practice has been to construct these pans either entirely of cast metal such as cast iron of semi-steel, or part cast metal and part wrought metal, the bottom and rim portions of the pan being formed separately and bolted or riveted together to form the complete pan. In the partially cast and partially wrought pan, the rim portion is made of wrought metal.

In the case of pan structures having rims of cast metal, such rims may sometimes weigh in the neighborhood of twenty-five hundred (2500) pounds. It frequently happens that these rims have to be discarded because they have become worn for a distance of perhaps only two or three inches upwardly from their bottom edges. Not only is considerable waste of material involved, but there is also a large amount of labor and time lost incident to the making of such changes.

In both forms, the rims are commonly made in segments which are brought into abutting relation, and are connected at the joints by an outside lap plate or strap which is riveted or bolted to the segments. The rim as thus formed is bolted to the peripheral edge of the pan bottom.

In the form of construction of pans as above described, obviously, inherently the greater weaknesses are developed at the joints which form the connections between the sections that form the rim, and at the connections between the rim and bottom.

In the working of heavy clays and other material, there is set up vibratory and twisting strains by the mullers or rollers of the pan, which tend to loosen the joints and distort the pan, resulting in frequent repairs and replacing of parts.

One object of my invention is to provide a pan structure having a rim provided with a liner which is detachably connected thereto, so that it may be readily removed and replaced by a new liner.

Another object is to provide an improved form of construction for pans of such character as to effectually resist these stresses produced in working which tend to weaken the pan, and a further object is to provide an improved form of connection between the rim and the bottom portion of the pan.

My invention may be readily understood by reference to the accompanying drawing, which shows a preferred embodiment of my invention, and in which—

Figure 1 is a top plan view, partly broken away, of a pan constructed in accordance with my invention;

Fig. 2 is a vertical sectional view through the side of the pan, taken on the line II—II of Fig. 1;

Fig. 3 is a view similar to Fig. 2, taken on the line III—III of Fig. 1, and Fig. 4 is a side elevational view of a portion of the pan at one of the joints.

In the present invention the pan is formed with a rim portion 2 which preferably is made up of two semi-circular wrought metal sections joined together at diametrally opposite points. Each section comprises a plurality of wrought metal plates, which are suitably formed in bending rolls to give the proper contour, and the several plates of the two sections are then assembled with their ends in abutting relation, so as to produce a laminated circular structure having staggered or broken joint connections between the several plies which form the rim. The rim as herein shown comprises two plies of wrought plates, an outer plate section 3 and an inner or liner plate section 4. Three or more plies of plates may be employed, as desired, without departing from my invention.

The joint between the outer rim section or lamination is shown at 5 and the joint of the inner lamination is shown at 6. In case of three laminations being employed, the intermediate joint preferably would be disposed between the joints 5 and 6. As the joint forms the weakest portion of the completed rim a lap plate 7 is bolted to the outside of the outer rim plates to stiffen the joint, the plate 7 being preferably bolted thereto by countersunk bolts 8. The liner plates 4 are detachably connected to the outer plates 3, by screws or bolts 9, so that when the liner plates become worn they may be readily replaced without the necessity of discarding other portions of the pan structure.

In some pan structures, the liner plates will weigh only about eight hundred (800) pounds, as compared to cast rims of similar diameter which weigh about twenty-five hundred (2500) pounds. Furthermore, when replacing the cast rims, they have to be completely torn off, while in my rim it is only necessary to take out the screws 9 when replacing the liner.

Referring to Fig. 3 which is a typical cross sectional view of the rim between joints, the outer and inner plies of the rim are shown as being of different heights, the lower edge of the inner ply terminating at a point above the lower edge of the outer ply, and forming a shouldered recess 10 at the lower edge of the rim which is adapted to receive a rib or flange 11. This arrangement also facilitates replacement of liners without disturbing the bottom. The flange 11 is shown as made up of several arcuately-shaped bars whose ends are in abutting engagement at 11a. These bars are formed preferably from steel stock by a cutting torch and bent in forming rolls to the desired shape and have the beveled faces 12. The several bars are detachably fastened to the rim by screw bolts 13. The flange 11 forms a shoulder upon which the bottom 14 of the pan seats. The peripheral edge of the bottom is provided with a bevel face 15 which seats upon the bevel face 12. The connection between the rim flange and the bottom as herein shown is devised primarily as means to facilitate the making of a welded connection between the rim and bottom. The weld is preferably of spot weld character, at various points along the beveled lap of the joint and may be made either from the inside or the outside of the pan.

Instead of a welded joint between the flange 11 and the bottom, a bolted connection may be employed, without greatly modifying the structure. For instance, cap screws could be employed to connect the bottom to the flange 11, or the parts may be keyed to one another to form a driving connection.

The invention results in considerable saving in the maintenance and building of pans of this type, as worn liners can be readily replaced and the material from which the rim is formed may be bought in the open market and suitably formed by simple bending rolls, the supporting rim for the bottom being likewise formed in a simple manner by the flame cutting method.

A particular advantage arises by reason of the beveled flange construction, as in this manner of forming the support or connection for the bottom, the rim may be separately and completely formed before assembly on the bottom, and in the assembling of the parts, the rim may be aligned accurately so as to run true with the base, without the necessity of making a seat for the rim, as the beveled construction forms in effect a universal joint whereby the parts may be trued before being joined together.

A further advantage arises by reason of increased strength through use of the laminated structure for the rim of the present invention, over the cast rim or the wrought rim of single thickness. While I have shown and described a preferred embodiment of my invention, it will be understood that this is merely illustrative of the invention and that various changes and modifications may be made therein within the spirit of my invention and the scope of the broader claims.

I claim as my invention:—

1. A grinding and mixing pan having a bottom and a rim portion composed of a plurality of sets of annularly arranged plates assembled in laminated relation, the adjacent vertical edges of each set of plates having abutting relation, the joints thus formed in one set of plates being circumferentially offset with respect to the joints of the other set, and means for detachably connecting each set of said plates together.

2. A grinding and mixing pan having a bottom and a rim portion composed of a plurality of sets of annularly arranged plates assembled in laminated relation, the adjacent vertical edges of each set of plates having abutting relation, and means for detachably connecting each set of said plates together.

3. A grinding and mixing pan composed of inner and outer plates arranged in laminated relation, the outer plates extending to a point below the lower edge of the inner plates, and a flange member secured to the inner periphery of said outer plates and abutting against the lower edges of the inner plates.

4. A grinding and mixing pan composed of inner and outer plates arranged in laminated relation, the outer plates extending to a point below the lower edge of the inner plates, and a flange member secured to the inner periphery of said outer plates, and abutting against the lower edges of the inner plates, the said flange having a bevelled surface for receiving a complementally formed edge of a bottom plate.

5. A grinding and mixing pan composed of inner and outer plates arranged in laminated relation, the outer plates extending to a point below the lower edge of the inner plates, and a flange member secured to the inner periphery of said outer plates and abutting against the lower edges of the inner plates, the inner plates being detachably connected to the outer plates.

In testimony whereof I, the said SAMUEL BLAINE STINE, have hereunto set my hand.

SAMUEL BLAINE STINE.